(12) United States Patent
Lee

(10) Patent No.: US 7,911,327 B2
(45) Date of Patent: Mar. 22, 2011

(54) VIBRATION DEVICE AND METHOD OF FABRICATING THE SAME

(75) Inventor: Kap Jin Lee, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 353 days.

(21) Appl. No.: 12/267,960

(22) Filed: Nov. 10, 2008

(65) Prior Publication Data

US 2009/0121559 A1 May 14, 2009

(30) Foreign Application Priority Data

Nov. 12, 2007 (KR) .................. 10-2007-0114652

(51) Int. Cl.
*H04B 3/36* (2006.01)

(52) U.S. Cl. .................. 340/407.1; 340/683; 340/691.1; 340/691.7; 340/693.5; 340/7.6

(58) Field of Classification Search ............... 340/407.1, 340/582, 672, 679, 683, 686.3, 691.1, 691.7, 340/693.5, 7.6

See application file for complete search history.

(56) References Cited

U.S. PATENT DOCUMENTS

| 4,675,907 | A | * | 6/1987 | Itagaki et al. ................. 381/152 |
| 5,894,263 | A | * | 4/1999 | Shimakawa et al. ........ 340/388.1 |
| 6,211,775 | B1 | * | 4/2001 | Lee et al. .................... 340/407.1 |
| 7,285,236 | B2 | * | 10/2007 | Chung ........................... 264/160 |
| 2004/0146175 | A1 | * | 7/2004 | Chung ........................... 381/398 |
| 2005/0184601 | A1 | | 8/2005 | Kweon et al. |
| 2006/0001324 | A1 | | 1/2006 | Won et al. |
| 2006/0022781 | A1 | | 2/2006 | Kim |
| 2007/0187172 | A1 | | 8/2007 | Kaneda et al. |

FOREIGN PATENT DOCUMENTS

| CN | 2836331 Y | 11/2006 |
| JP | 2004-064169 A | 2/2004 |
| KR | 10-2006-0046360 A | 5/2006 |

* cited by examiner

*Primary Examiner* — Daryl Pope
(74) *Attorney, Agent, or Firm* — Saliwanchik, Lloyd & Eisenschenk

(57) ABSTRACT

A vibration device is provided. The vibration device includes a case, a vibrator, a coil, and a spring. The vibrator is disposed inside the case and including a magnet, a yoke, and a weight. The coil is supported by the case. The spring allows the vibrator to be elastically supported by the case. The spring includes a first coupling portion coupled to the vibrator, a second coupling portion coupled to the case, and a connecting portion connecting the first coupling portion to the second coupling portion. The second coupling portion is disposed on a concentric circle with respect to a center of the first coupling portion. A region in which the second coupling portion is disposed on the concentric circle ranges from 40% or more to less than 100% of a total region of the concentric circle.

15 Claims, 5 Drawing Sheets

VIBRATION DEVICE AND METHOD OF FABRICATING THE SAME

CROSS-REFERENCE TO RELATED APPLICATION

The present application claims the benefit under 35 U.S.C. §119(e) of Korean Patent Application No. 10-2007-0114652, filed Nov. 12, 2007, which is hereby incorporated by reference in its entirety.

FIELD OF THE INVENTION

The present disclosure relates to a vibration device and a method of fabricating the same.

BACKGROUND

Vibration devices may be used for various electronic equipments such as a mobile communication terminal, a speaker, and a video game console. Representatively, such a vibration device performs a vibration function for informing signal arrival and a signal input in the mobile communication terminal.

The vibration device transmits vibration of a weight flexibly supported by a spring to the outside to generate vibration at the electronic equipments.

A vibration quantity of the vibration device is in proportion to a square of a resonant frequency. Thus, deviations occur in an elastic coefficient of the spring and size of the weight due to a deviation generated in a manufacturing process of the weight or the spring to disperse the resonant frequency.

BRIEF SUMMARY

Embodiments provide a vibration device having a novel structure.

Embodiments also provide a vibration device in which a deviation generated in a manufacturing process can be complemented to adjust an elastic coefficient of a spring so that the vibration device is operated at an optimum resonant frequency.

Embodiments also provide a vibration device that can be manufactured in a thin thickness and a small size.

In one embodiment, a vibration device includes: a case; a vibrator disposed inside the case, the vibrator comprising a magnet, a yoke, and a weight; a coil supported by the case; and a spring allowing the vibrator to be elastically supported by the case, wherein the spring comprises a first coupling portion coupled to the vibrator, a second coupling portion coupled to the case, and a connecting portion connecting the first coupling portion to the second coupling portion, and wherein the second coupling portion is disposed on a concentric circle with respect to a center of the first coupling portion, and a region in which the second coupling portion is disposed on the concentric circle ranges from 40% or more to less than 100% of a total region of the concentric circle.

In another embodiment, a vibration device includes: a case; a vibrator comprising a yoke disposed inside the case, a magnet coupled to an inner surface of the yoke and spaced a first distance from the inner surface of the yoke, and a weight coupled to an outer surface of the yoke; a coil correspondingly disposed in a space between the yoke and the magnet and supported by the case, the coil having a width less than the first distance; and a spring allowing the vibrator to be elastically supported by the case, wherein the spring comprises a first coupling portion coupled to the vibrator, a plurality of second coupling portions coupled to the case and comprising a guide hole, and a plurality of connecting portions connecting the first coupling portion to the plurality of second coupling portions.

The details of one or more embodiments are set forth in the accompanying drawings and the description below. Other features will be apparent from the description and drawings, and from the claims.

DETAILED DESCRIPTION

Hereinafter, a vibration device and a method of manufacturing the same according to embodiments will be described in detail with reference to the accompanying drawings.

Figure 1:
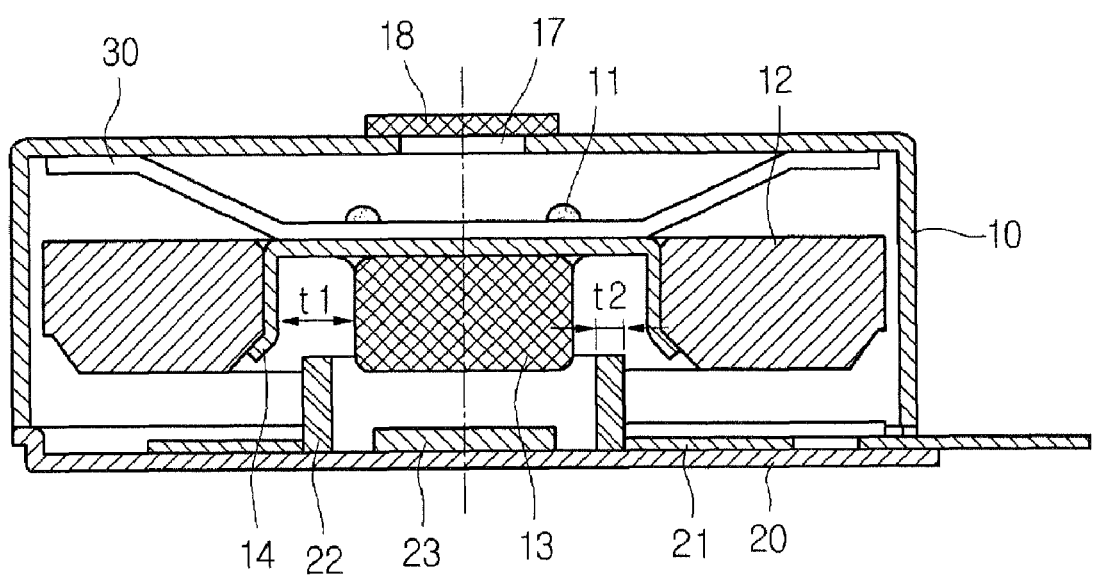
FIG. 1 is a cross-sectional view of a vibration device according to an embodiment.
Figure 2:
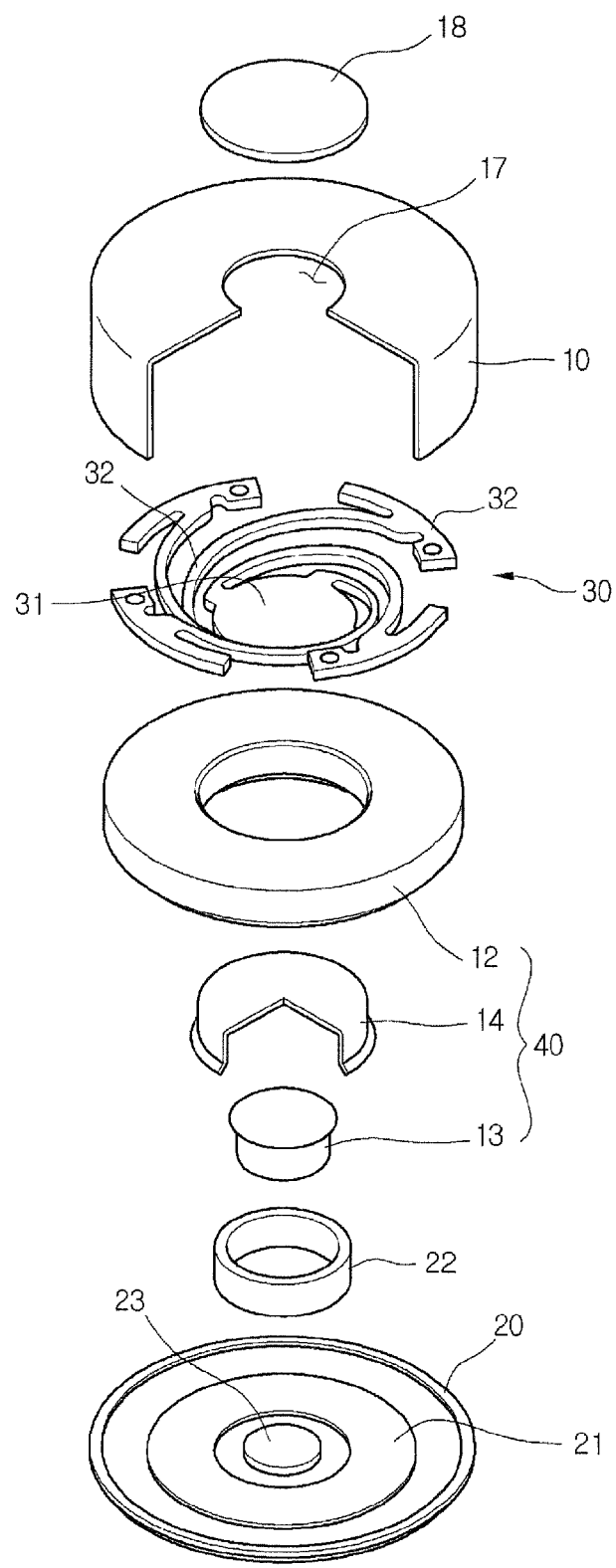
FIG. 2 is an exploded perspective view of a vibration device according to an embodiment.

FIG. 1 is a cross-sectional view of a vibration device according to an embodiment, and FIG. 2 is an exploded perspective view of a vibration device according to an embodiment. For further understanding, an upper case 10 and a yoke 14 are shown as partially cut-away in FIG. 2.

Referring to FIGS. 1 and 2, the vibration device according to an embodiment includes the upper case 10, a lower case 20, a spring 30, a weight 12, a magnet 13, the yoke 14, and a coil 22.

The upper case 10 and the lower case 20 are mutually coupled to define an inner space of the vibration device. The upper case 10 and the lower case 20 protect the inner space of the vibration device and transmit a vibration generated by the vibration device to an external device.

The spring has one side coupled to the upper case 10 and the other side couplet to the yoke 14.

The weight 12 is coupled to an outer surface of the yoke 14, and the magnet 13 is coupled to an inner surface of the yoke 14.

The weight 12 has a ring shape and is coupled to the outer surface of the yoke 14. A lower portion of the outer surface of the yoke 14 protrudes in a direction in which the weight 12 is disposed. That is, the lower portion of the outer surface of the yoke 14 has a diameter greater than an upper portion of the outer surface of the yoke 14. A portion of the yoke 14 is disposed on the same vertical surface as that of the weight 12. Thus, the yoke 14 can more firmly support the weight 12.

The magnet 13 has a circular plate shape. A side surface of the magnet 13 is spaced a predetermined distance t1 from the inner surface of the yoke 14. The distance t1 between the magnet 13 and the inner surface of the yoke 14 is greater than a width t2 of the coil 22.

In a process in which a vibrator 40 including the weight 12, the magnet 13, and the yoke 14 is vibrated in upward and downward directions, when the vibrator 40 is moved in the downward direction, the vibrator 40 is positioned in a space between the magnet 13 and the yoke 14.

Thus, the vibrator 40 does not collide with the coil 22 even if the vibrator 40 is vibrated in the upward and downward directions. This means that an up-and-down vibration width of the vibrator 40 may increase by a height of the coil 22. Therefore, the vibration device may be manufactured in a thinner size, and a vibration quantity of the vibrator 40 may increase.

That is to say, since the vibration width of the vibrator 40 is not limited in order to prevent the vibrator 40 from colliding with the coil 22, the vibration quantity of the vibrator 40 may increase. That is, since the vibration width of the vibrator 40 is not limited to the height of the coil 22, the vibration device may be manufactured in the thinner size, and the vibration quantity of the vibrator 40 may increase.

A circuit substrate 21, an impact energy absorbing member 23, and the coil 22 are disposed in the lower case 20.

The circuit substrate 21 may include a flexible printed circuit board (FPCB) and supplies a power to the coil 22.

The impact-energy absorbing member 23 faces the magnet 13 and has a thickness thicker than that of the circuit substrate 21.

The impact-energy absorbing member 23 inhibits a noise from being generated by collision of the magnet 13 and the lower case 20. In addition, the impact-energy absorbing member 23 inhibits the vibrator 40 from colliding with the circuit substrate 21.

A ferrofluid 11 is disposed on a top surface of the vibrator 40 connected to the spring 30. The ferrofluid 11 reduces a contact noise generated during an up-and-down movement of the vibrator 40. Although not shown, the ferrofluid 11 may be disposed on a bottom surface of the magnet 13 and disposed on top and bottom surfaces of the magnet 13.

An opening 17 and a shield member 18 are disposed in and on the case 10.

The opening 17 is used for welding the spring 30 to the yoke 14 in a manufacturing process of the vibration device. The shield member 18 prevents a foreign substance from being introduced inside the vibration device through the opening 17 after an assembly of the vibration device is completed.

When a power is applied to the coil 22, the vibrator 40 of the vibration device is vibrated in the upward and downward directions due to an interaction between a electromagnetic force having a predetermined frequency generated by the coil 22 and a magnetic force generated in the magnet 13.

The vibrator 40 may not be vibrated at a desired resonant frequency due to a manufacturing deviation generated in a process of manufacturing each of components of the vibration device.

Thus, the vibration device according to an embodiment changes an elastic coefficient of the spring 30 to allow the vibrator 40 to be vibrated according to a designed resonant frequency.

Figure 3:
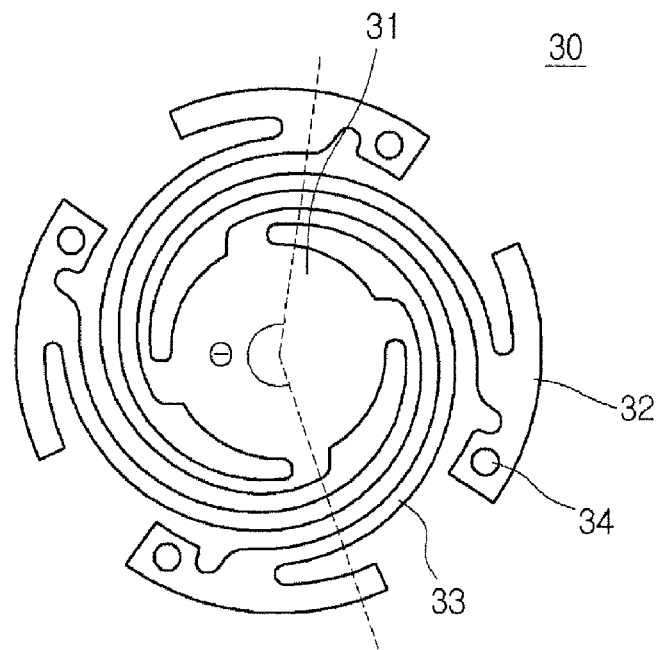
FIG. 3 is a plan view of a spring.
Figure 4:
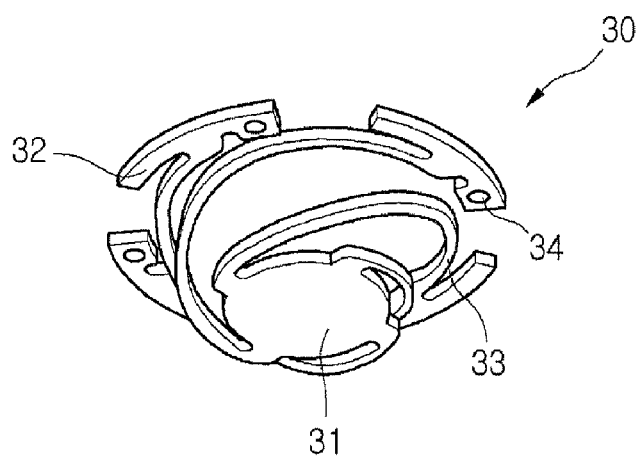
FIG. 4 is a perspective view of a spring.

FIG. 3 is a plan view of the spring, and FIG. 4 is a perspective view of the spring.

The spring 30 includes a first coupling portion 31, a second coupling portion 32, and a connecting portion 33.

The first coupling portion 31 is coupled to the vibrator 40 including the weight 12, the magnet 13, and the yoke 14. A design of the vibrator 40 may be variously modified, and thus, a coupling structure between the first coupling portion 31 and the vibrator 40 may be modified. In this embodiment, the first coupling portion 31 is coupled to the yoke 14 as an example.

The second coupling portion 32 is coupled to the upper case 10. Two to six second coupling portions 32 may be provided. In this embodiment, four second coupling portions 32 are provided.

The second coupling portion 32 is disposed on a concentric circle with respect to a center of the first coupling portion 31. Guide holes 34 are defined in the second coupling portion 32. The guide holes 34 are disposed on the concentric circle with respect to the center of the first coupling portion 31.

The connecting portion 33 connects the first coupling portion 31 to the second coupling portion 32 and provides elasticity.

The connecting portion 33 surroundingly extends from the first coupling portion 31.

The connecting portion 33 extends in a spiral shape from the second coupling portion 32 and is connected to the first coupling portion 31. The connecting portion 33 surroundingly extends from the first coupling portion 31 in a range of 150 to 220 degrees with respect to the center of the first coupling portion 31.

The connecting portion 33 is not limited to the spiral shape. For example, the connecting portion 33 may be realized with various shapes such as a straight shape, a zigzag shape, and a curved shape.

An extending angle $\theta$ at which the connecting portion 33 surrounds the first coupling portion 31 is illustrated in FIG. 3. In this embodiment, the extending angle $\theta$ ranges from 150 to 220 degrees.

When the extending angle $\theta$ is less than 150 degrees, the spring 30 has a low elastic coefficient. In addition, it is difficult to adjust the elastic coefficient of the spring 30. When the extending angle $\theta$ is greater than 220 degrees, the spring may be excessively vibrated, and a force supporting the weight 12 may be weak. In FIG. 3, the extending angle $\theta$ is designed at 200 degrees as an example.

Figure 5:
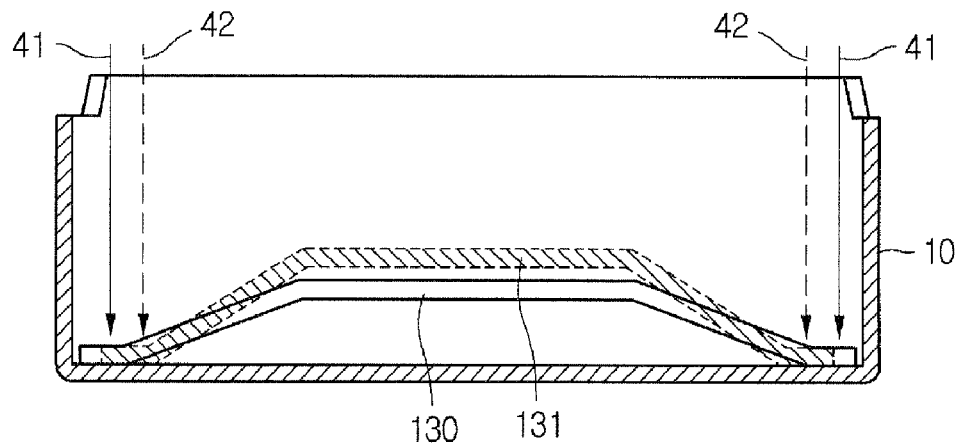
FIG. 5 is a view illustrating a configuration change of a spring according to a position at which a fixture and a guide hole are disposed.
Figure 6:
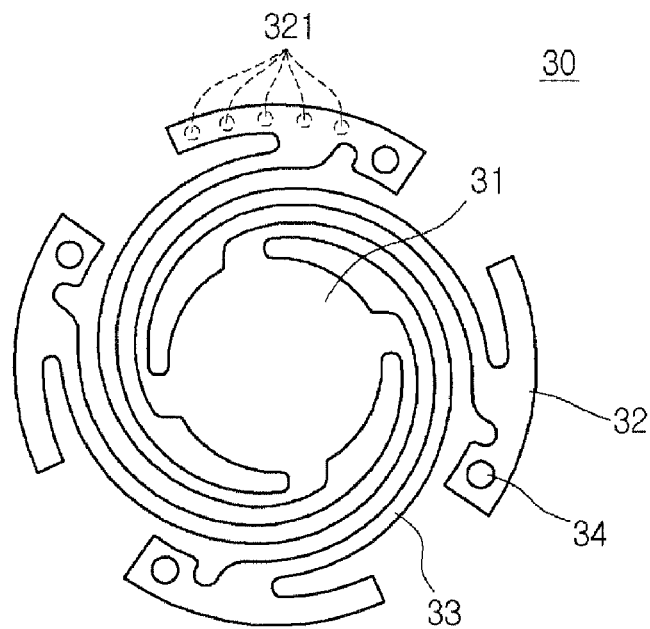
FIG. 6 is a view illustrating a welding region of a spring.

FIGS. 5 and 6 are views for explaining a coupling state of the spring and the upper case while the elastic coefficient of the spring is adjusted in the vibration device according to an embodiment.

The spring 30 may be coupled to the upper case 10 using a welding process.

A coupling between the spring 30 and the upper case 10 are performed according to the following processes.

A fixture (not shown) is inserted into the guide holes 34 of the spring 30 to fixedly weld the second coupling portion 32 to the upper case 10 in a state where the second coupling portion 32 of the spring 30 is in contact with an inner surface of the upper case 10.

The fixture is inserted into the four guide holes 34 defined in the spring 30, and the fixture and the guide holes 34 are disposed on the concentric circle with respect to the center of the first coupling portion 31.

For adjusting the elastic coefficient of the spring 30, the second coupling portion 32 and the upper case 10 may be welded to each other in case where the fixture and the guide holes 34 are disposed on a concentric circle 41 having a first radius with respect to the center of the first coupling portion 31.

Also, the second coupling portion 32 and the upper case 10 may be welded to each other in case where the fixture and the guide holes 34 are disposed on a concentric circle 42 having a second radius with respect to the center of the first coupling portion 31.

FIG. 5 illustrates changes of a configuration and the elastic coefficient of the spring 30 according to a position at which the fixture and the guide holes 34 are disposed.

For example, in case where the fixture and the guide holes 34 are disposed on the concentric circle 41 having the first radius, the spring 30 has a first configuration 130. Also, in case where the fixture and the guide holes 34 are disposed on the concentric circle 42 having the second radius, the spring 30 has a second configuration 131.

Thus, it is possible to properly adjust the elastic coefficient of the spring 30.

A selected region of the second coupling portion 32 of the spring 30 is welded to the upper case 10. Five welding regions 321 are defined on the second coupling portion 32 in FIG. 6, and at least one welding region 321 is welded to the upper case 10.

A length of an elastic region of the spring 30 is changed according to a position of the welding region 321 in which the second coupling portion 32 is welded to the upper case 10, and thus, the elastic coefficient of the spring 30 can be adjusted.

That is, in case where a welding position is disposed away from a position at which the connecting portion 33 is connected to the second coupling portion 32, the elastic coefficient is low. In case where the welding position is close to the position at which the connecting portion 33 is connected to the second coupling portion 32, the elastic coefficient is high. Thus, the elastic coefficient can be adjusted according to the welding position.

In this embodiment, the second coupling portion 32 is provided in plurality, and the second coupling portions 32 are disposed on the concentric circle with respect to the center of the first coupling portion 31.

A region in which the second coupling portions 32 are disposed on the concentric circle ranges from 40% or more to less than 100% of a total region of the concentric circle.

In case where the region in which the second coupling portions 32 are disposed on the concentric circle is less than 40% of the total region of the concentric circle, the selectable welding region 321 of the second coupling portion 32 is limited. Thus, it is difficult to adjust the elastic coefficient of the spring 30. In case where the region in which the second coupling portions 32 are disposed on the concentric circle is 100% of the total region of the concentric circle, it is effectively impossible to adjust the elastic coefficient of the spring 30 by adjusting the radius in which the second coupling portion is disposed as described FIG. 5.

Figure 7:
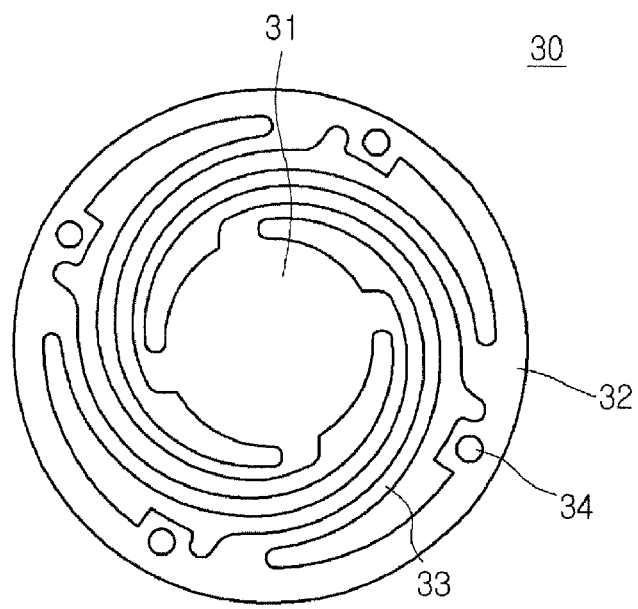
FIG. 7 is a view illustrating an example in a case where a region in which second coupling portions of a spring are disposed on a concentric circle is 100%.

FIG. 7 is a view illustrating an example in a case where a region in which second coupling portions 32 of a spring 30 are disposed on a concentric circle is 100%. In this case, it is effectively impossible to adjust a radius in which the second coupling portion 32 is disposed.

Figure 8:
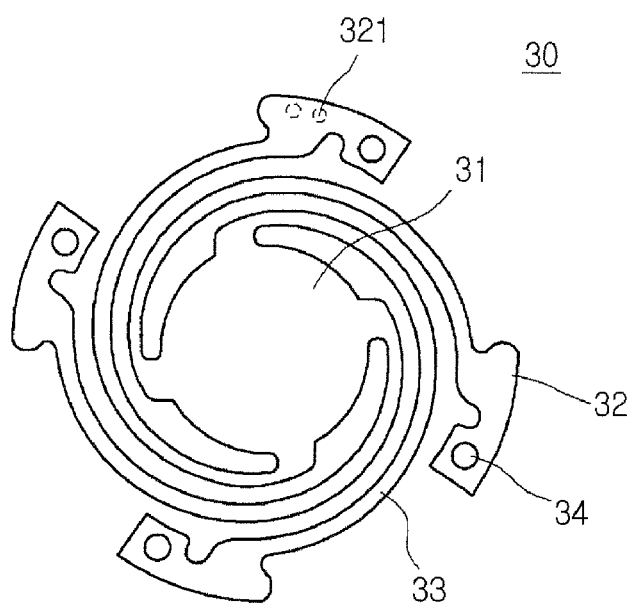
FIG. 8 is a view illustrating an example in a case where a region in which second coupling portions of a spring are disposed on a concentric circle is 20% of a total region.

FIG. 8 is a view illustrating an example in a case where a region in which second coupling portions 32 of a spring 30 are disposed on a concentric circle is 20% of a total region of the concentric circle. In this case, a selectable welding region 321 of the second coupling portion 32 is limited.

Therefore, in the vibration device according to the embodiment, the region in which the second coupling portions 32 are disposed on the concentric circle ranges from 40% or more to less than 100% of the total region of the concentric circle.

After the second coupling portion 32 of the spring 30 is welded to the upper case 10, the vibrator 40 is welded to the first coupling portion 31 of the spring 30 through the opening 17 of the upper case 10.

The lower case 20 in which the circuit substrate 21 and the coil 22 are installed is coupled to the upper case 10 to assemble the vibration device.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vibration device comprising:
   a case;
   a vibrator disposed inside the case, the vibrator comprising a magnet, a yoke, and a weight;
   a coil supported by the case; and
   a spring allowing the vibrator to be elastically supported by the case,
   wherein the spring comprises a first coupling portion coupled to the vibrator, a second coupling portion coupled to the case, and a connecting portion connecting the first coupling portion to the second coupling portion, and
   wherein the second coupling portion is disposed on a concentric circle with respect to a center of the first coupling portion, and a region in which the second coupling portion is disposed on the concentric circle ranges from 40% or more to less than 100% of a total region of the concentric circle.

2. The vibration device according to claim 1, the second coupling portion is provided as wherein two to six second coupling portions.

3. The vibration device according to claim 1, wherein the second coupling portion comprises a guide hole for fixing the second couple portion to the case.

4. The vibration device according to claim 1, wherein the connecting portion surroundingly extends from the first coupling portion, and an extending angle θ of the connecting portion surroundingly extending from the first coupling portion ranges from 150 to 220 degrees.

5. The vibration device according to claim 1, wherein the magnet is coupled to an inner surface of the yoke, and the weight is coupled to an outer surface of the yoke.

6. The vibration device according to claim 1, wherein the first coupling portion is fixed to a top surface of the yoke.

7. The vibration device according to claim 1, further comprising a circuit substrate disposed inside the case to provide a power to the coil.

8. The vibration device according to claim 1, further comprising an impact-energy absorbing member facing the magnet disposed inside the case.

9. The vibration device according to claim 1, further comprising a ferrofluid disposed on a top surface of the vibrator connected to the spring.

10. A vibration device comprising:
a case;
a vibrator comprising a yoke disposed inside the case, a magnet coupled to an inner surface of the yoke and spaced a first distance from the inner surface of the yoke, and a weight coupled to an outer surface of the yoke;
a coil correspondingly disposed in a space between the yoke and the magnet and supported by the case, the coil having a width less than the first distance; and
a spring allowing the vibrator to be elastically supported by the case,
wherein the spring comprises a first coupling portion coupled to the vibrator, a plurality of second coupling portions coupled to the case and comprising a guide hole, and a plurality of connecting portions connecting the first coupling portion to the plurality of second coupling portions.

11. The vibration device according to claim 10, wherein the second coupling portions are disposed on a concentric circle with respect to a center of the first coupling portion, wherein a region in which the second coupling portion are disposed on the concentric circle ranges from 40% or more to less than 100% of a total region of the concentric circle.

12. The vibration device according to claim 10, wherein the connecting portions respectively surroundingly extend from the first coupling portion, and an extending angle $\theta$ of each of the connecting portions surroundingly extending from the first coupling portion ranges from 150 to 220 degrees.

13. The vibration device according to claim 10, wherein a lower portion of the outer surface of the yoke protrudes in a direction in which the weight is disposed, and a portion of the yoke is disposed on the same vertical surface as that of the weight.

14. The vibration device according to claim 10, further comprising a circuit substrate for providing a power to the coil and an impact-energy absorbing member disposed inside the case.

15. The vibration device according to claim 14, wherein a thickness of the impact-energy absorbing member is greater than that of the circuit substrate.

\* \* \* \* \*